(12) United States Patent
Mamleev

(10) Patent No.: US 10,132,416 B2
(45) Date of Patent: Nov. 20, 2018

(54) CERMET BALL GATE AND METHOD OF PRODUCING

(71) Applicant: MaRoma Technologies Ltd, Ufa (RU)

(72) Inventor: Rustam Faritovich Mamleev, Ufa (RU)

(73) Assignee: MAROMA TECHHNOLOGIES LTD., Ufa (RU)

( * ) Notice: Subject to any disclaimer, the term of this patent is extended or adjusted under 35 U.S.C. 154(b) by 0 days.

(21) Appl. No.: 14/425,021

(22) PCT Filed: Jan. 23, 2013

(86) PCT No.: PCT/RU2013/000048
§ 371 (c)(1),
(2) Date: Mar. 6, 2015

(87) PCT Pub. No.: WO2014/038973
PCT Pub. Date: Mar. 13, 2014

(65) Prior Publication Data
US 2015/0204449 A1    Jul. 23, 2015

(30) Foreign Application Priority Data
Sep. 7, 2012 (RU) ................................ 2012138499

(51) Int. Cl.
*F16K 5/06* (2006.01)
*C22C 29/10* (2006.01)
(Continued)

(52) U.S. Cl.
CPC ............ *F16K 5/0657* (2013.01); *B22D 19/00* (2013.01); *B22D 30/00* (2013.01); *B22F 5/10* (2013.01);
(Continued)

(58) Field of Classification Search
CPC .... F16K 5/0657; F16K 25/005; F16K 27/065; B22D 19/00; B22D 30/00; C22C 29/10;
(Continued)

(56) References Cited

U.S. PATENT DOCUMENTS 6,338,906 B1 * 1/2002 Ritland et al. ............. 428/539.5

FOREIGN PATENT DOCUMENTS

RU      2401719 C2 * 10/2010

* cited by examiner

*Primary Examiner* — Colleen P Dunn
*Assistant Examiner* — Anthony M Liang
(74) *Attorney, Agent, or Firm* — Arent Fox LLP; Michael Fainberg

(57) ABSTRACT

The invention relates to pipeline control valves, in particular to manufacturing of ball gates on the basis of TiC. The cermet structure consists of a homogeneous metal matrix and uniformly arranged TiC grains in it, and has fragments with a matrix, matrix-framework and framework structures. TiC powder is placed in the mold with preliminary placed porous TiC inserts in it and sintered in the heating furnace in the chamber with non-oxidizing environment. The mold with the carbide semi-product is removed from the heating furnace after sintering. The infiltrate is placed and melted in the crucible located in the same chamber and cast in the mold till contacting the carbide semi-product ensuring its complete infiltration with the molten metal. The invention enables combining the structure and properties over the zones and improving the quality of cermet items.

16 Claims, 2 Drawing Sheets

Figure 1:
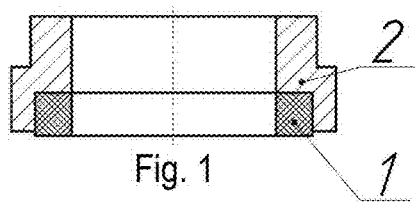

(51) Int. Cl.
*B22F 5/10* (2006.01)
*F16K 25/00* (2006.01)
*F16K 27/06* (2006.01)
*B22D 19/00* (2006.01)
*B22D 30/00* (2006.01)

(52) U.S. Cl.
CPC ............ *C22C 29/10* (2013.01); *F16K 25/005* (2013.01); *F16K 27/065* (2013.01); *B22F 2999/00* (2013.01)

(58) Field of Classification Search
CPC .. E06B 7/2303; E06B 7/2312; B22F 2999/00; B22F 2202/01; B22F 3/02; B22F 5/10
See application file for complete search history.

CERMET BALL GATE AND METHOD OF PRODUCING

A group of inventions relates to pipeline control valves, in particular to manufacturing of wear-resistant ball gates for technological lines with abrasive and high-temperature environments in oil-refining, petrochemical, power and other branches of industry.

There are ball gates entirely produced from ceramic materials on the basis of aluminum or zirconium oxides, silicon carbide or nitride [U.S. Pat. No. 4,795,133, IPC F16K 5/06 published on 3 Jan. 1989; Patent JP 4351382, IPC F16K5/06 published on 12 Jul. 1992; patent PL 108889U, IPC 16K5/08 published on 10 May 1999; Patent JP 2001074149, IPC F16K5/06 published on 23 Mar. 2001].

Ceramic materials are characterized by high hardness, wear resistance and service life when used in abrasive and high-temperature technological environments.

Drawbacks of counterparts:
- low resistance against thermal shocks: for example, heat resistance (heating up to the critical temperature and quick cooling without crack initiation in the sample≈Ø30*30 mm) is −120 for aluminum oxide, −250 for zirconium dioxide, −450 for silicon carbide, −550° C. for silicon nitride;
- zero ductility and low resistance against mechanical shocks;
- large allowances for machining of a ball gate due to technical complexity of manufacturing a homogeneous semi-product when molding ceramic powder, which suffers significant (up to 35%) linear shrinkage during sintering. This is due to the initial powder compact with inhomogeneous density having pores up to 60% of the volume, which reduce to 0.5-1% after the subsequent sintering. Such considerable shrinkage in sintering with different rate and non-uniformity of a temperature field during heating results in intolerably high internal stresses accompanied with crack initiation in a sintered semi-product and high fraction of waste, which enhances labour intensity and self-cost of items. The labour intensity of processing is high due to extremely high hardness of pure ceramic materials.

There is a method of producing composite items, which includes preparation of a porous ceramic body from TiC, SiC, $B_4C$ etc, which afterwards is infiltrated with molten metals of Ni, Co, Fe etc. [U.S. Pat. No. 6,502,623, clas. B22C15/10 published on 7 Jan. 2003].

The known method does not allow implementing the process and producing a high-quality pore-free item, as there are no temperature and time regimes for producing composite material and environmental specifications.

There is a ball gate (prototype) for use in abrasive-carrying environments. The ball gate is produced from composite material based on ceramic materials, for example solid particles of TiC, $Al_2O_3$, $ZrO_2$ etc, bonded with polymers from the termo-hardening resins [Patent DE 19800894, IPC F16K5/06, F16K27/00 published on 22 Jul. 1999].

The ball gate has high wear resistance, resistance to thermal and mechanical shocks due to the structure, that is a ductile polymer matrix, in which solid ceramic particles are located uniformly.

The prototype disadvantages are low hardness and strength and limited operating temperatures of the composite material to 150° C. due to use of polymer binder.

There is a method (prototype) of manufacturing items from TiC-based cermet comprising:
- preparing a mold with a top vent from refractory material;
- placing and fixing a carbide porous semi-product in the mold;
- placing, vibrating compaction and sintering of the carbide powder in the mold in the heating chamber of the furnace with non-oxidizing atmosphere;
- removing the mold from the furnace chamber;
- placing infiltrate on the carbide semi-product in the mold;
- placing the mold in the graphite muffle of the induction furnace crucible;
- switching the inductor on;
- heating the mold and the infiltrate to the point exceeding the liquidus temperature and metal melt; the heating is fulfilled via heat transfer from the muffle by high-frequency current in the electromagnetic field of the inductor;
- feeding the molten metal to the carbide semi-product;
- infiltrating the carbide semi-product with the molten metal;
- removing the mold from the high-temperature zone with the set velocity;
- cooling and removing the produced cermet semi-product from the mold by breaking the latter down (Patent RU 2401719, IPC B22F3/26, C22C29/10 published on 20 Oct. 2010).

The method enables producing a ball gate with a structure consisting of TiC particles situated in the metal matrix of nickel-based alloy and steel. Such structure ensures high hardness, wear-resistance, resistance to mechanical and thermal shocks and high service life of a ball gate.

The disadvantage of the prototype is heterogeneity of the structure and chemical composition over the item volume. This is due to all the multicomponent alloys having time and temperature range of melting during solid-liquid transition. First a low-temperature phase melts near the solidus point during heating. After while at the final stage a high-temperature phase of different composition melts near the liquidus point. The solidification range for steels and nickel-based alloys is 20 . . . 70° C. As infiltrate is on the porous semi-product, the pores of the carbide semi-product infiltrate with the low-temperature phase, then the rest pore volume is filled with a high-temperature phase. This leads to inhomogeneity of the composition and physical and mechanical properties of the cermet material. Besides, the carbide semi-product dissolves in the zone of initial contact between the carbide semi-product and the molten metal. The structure is damaged up to separation and surfacing of separate carbide fragments on the melt surface.

The requirements to rubbing and rest zones of the ball gate, which determine its quality (service life), are different. The zones suffering rubbing and flow of abrasive medium should have high hardness and wear resistance. The rest zones should possess high bending (structural) strength.

The structure of cermet items can consist of:
- carbide grains isolated by a metal matrix—"matrix" structure of cermet;
- carbide grains that form a continuous framework—"framework" structure of cermet;
- carbide grains partially forming a continuous framework—"matrix-framework" structure of cermet;

The object of invention is to improve quality of a ball gate produced from TiC-based cermet with metal matrix for operation in the conditions of abrasive and high-temperature environment through producing items with a homogeneous structure and one or more fragments of different chemical composition and properties.

The object of invention is also a method ensuring manufacturing of a ball gate from cermet with the required chemical composition, structure and properties at the expense of one-stage infiltration of a carbide semi-product with molten metal of one composition immediately after sintering.

The technical result is a ball gate produced from cermet, the structure of which is a uniform metal matrix with uniformly arranged TiC grains in it. In the ball gate with the chemical composition uniform through the volume, the material has a matrix-framework structure, in which fragments with a matrix and framework structures alternate. The material has a matrix or framework structure or a matrix-framework structure once there are fragments of different chemical composition in the volume.

The technical result is also the method of producing a ball gate from cermet comprising the steps of:
preparing a mold with a vent from refractory material;
placing, vibrating compaction and sintering of Ti carbide powder in the furnace of the heating chamber with nonoxidizing environment to produce a porous carbide semi-product;
placing infiltrate on the carbide semi-product;
heating the infiltrate and the carbide semi-product to the temperature exceeding the infiltrate liquidus temperature;
Infiltrating the carbide semi-product with the molten metal to ensure directed solidification of metal in the pore volume of the carbide semi-product;
Cooling via shifting the mold downwards against the heating front to produce a ball gate, in which the infiltrate is melted in a separate crucible located inside the heating chamber, the produced molten metal is cast in the ceramic mold through the vent till contacting the carbide semi-product;
Maintaining the mold temperature during the period ensuring complete infiltration of the carbide semi-product with the molten metal to produce a homogeneous structure of the material.

In this method sintered inserts from the carbide semi-product with the set compositions are preliminarily prepared. The inserts are placed and fixed in separate parts of the mold. The free volume is filled with the carbide powder, the carbide powder is compacted and sintered to produce a carbide semi-product of the main composition. The cermet material with fragments of different compositions is formed during infiltration of the carbide semi-product of the main composition and carbide semi-product inserts with the set compositions with the molten metal followed by cooling and solidification of the metal matrix.

The porosity can be adjusted via changing the pressing and sintering parameters at the same cold binder, for example paraffine wax with zinc stearate or benzine-based adhesive. Usually in order to produce an item from cermet having entirely a "matrix" structure, a carbide semi-product with porosity from 55 to 70% is prepared. To produce an entirely "framework" structure, a carbide semi-product with porosity from 25 to 35% is prepared. To produce an entirely "matrix-framework" structure, a carbide semi-product with porosity from 35 to 55% is prepared. With the cold binder content increase, the semi-product porosity enhances. One can use the known methods to retain the continuous carbide framework in the carbide semi-product with the porosity from 55 to 70% through increasing the wall thickness between separate pores to produce an entirely framework structure.

It is reasonable to choose Ni-based and Cr—Ni alloys as metal matrix.

The carbide component content increase (therefore, decrease of the metal component content) in the cermet material is accompanied with the growth of hardness and wear resistance and reduction of the bending (structural) strength, decrease of resistance against thermal and mechanical shocks. In order to ensure high hardness and wear resistance, a framework structure is preferred; a matrix structure is preferred when the bending (structural) strength needs increase. Besides, with one and the same chemical composition through the whole volume of the cermet item, the matrix structure with isolated TiC grains ensures much higher values of the impact strength as compared to the framework structure.

Figure 2:
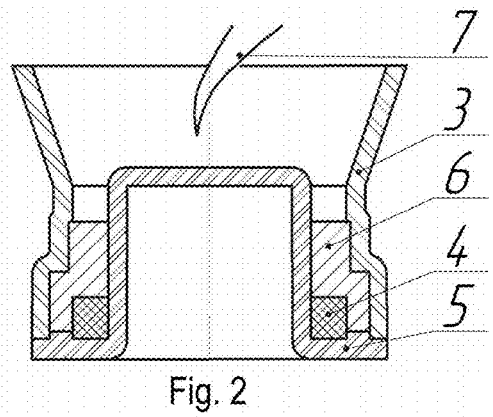
Figure 3:
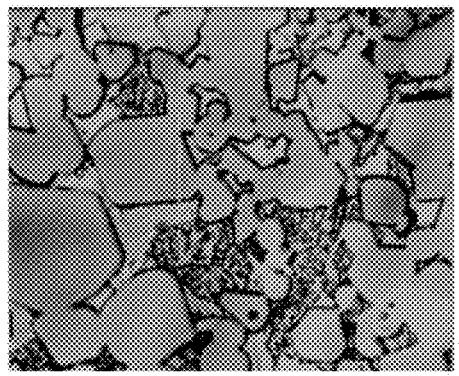
Figure 4:
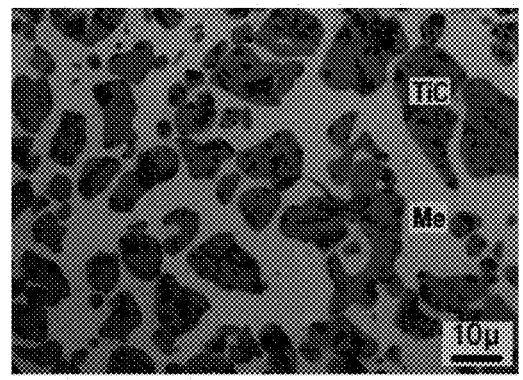
Figure 5:
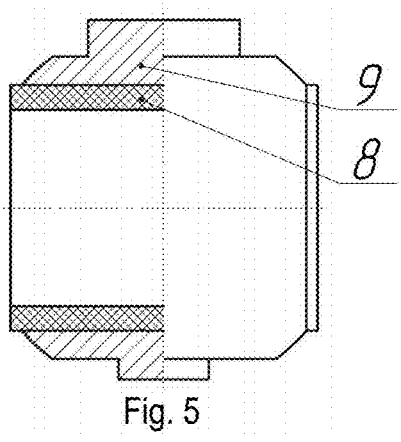
Figure 6:
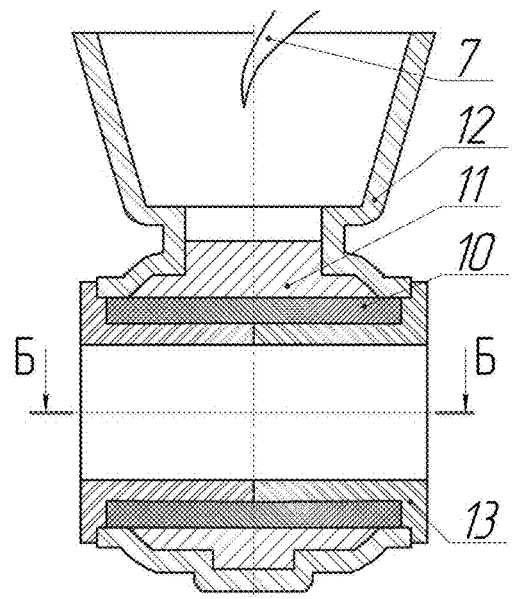
Figure 7:
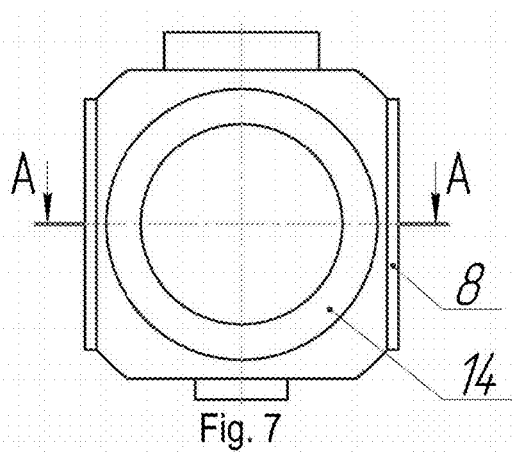
Figure 8:
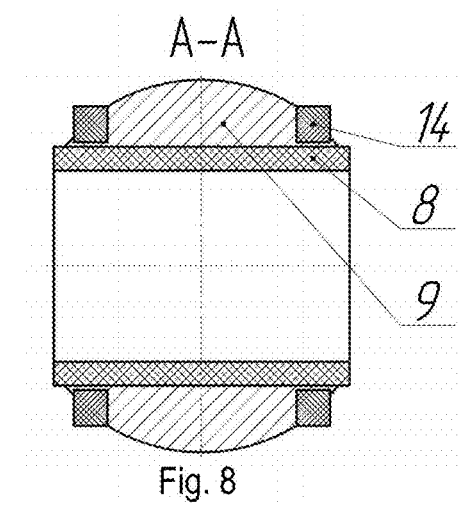
Figure 9:
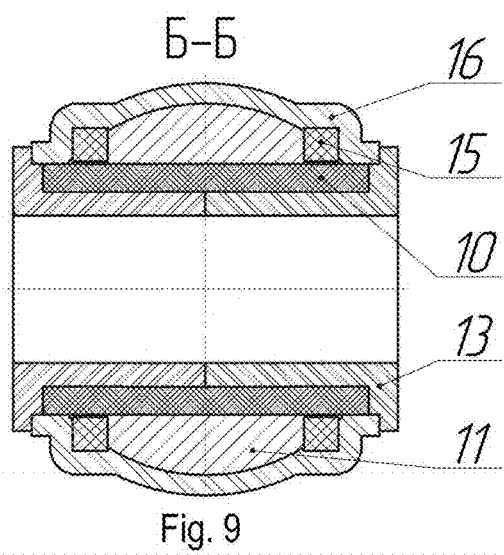
Figure 10:
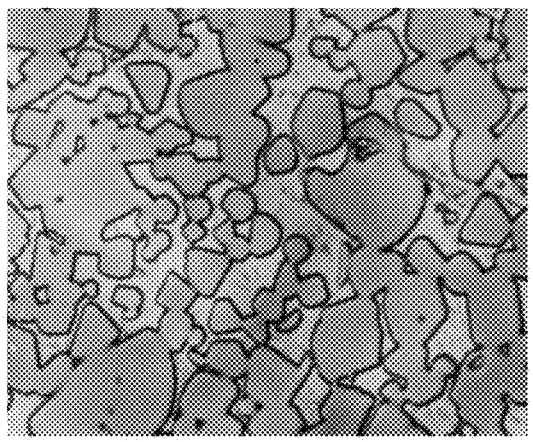

The invention is illustrated with the figures:
FIG. 1—The cermet seat-shaped semi-product with a working part fragment:
   1—fragment of the working part of the cermet seat;
   2—cermet seat base.
FIG. 2—assembling the mold to produce a seat-shaped semi-product from cermet with a working part fragment:
   3—mold (electrocorundum);
   4—preliminarily sintered insert from TiC;
   5—plug (electrocorundum);
   6—TiC powder compact;
   7—stream of molten metal during molding.
FIG. 3—matrix-framework structure of the seat working part fragment from TiC-ZhS6U cermet (×1000).
FIG. 4—Matrix structure of the seat base from TiC-ZhS6U cermet (×1000).
FIG. 5—A ball plug semi-product from cermet with a fragment of straight channel from cermet.
   8—a fragment of straight channel from cermet;
   9—a ball plug base.
FIG. 6—Assembly of the mold to produce a ball plug semi-product with a fragment of straight channel from cermet.
   10—preliminarily sintered insert from TiC;
   11—TiC powder compact;
   12—mold (electrocorundum);
   13—cap (electrocorundum).
FIG. 7—A ball plug semi-product from cermet with fragments of straight and closing parts from cermet.
   14—A fragment of the closing part from cermet;
FIG. 8—Section A-A of the ball plug semi-product from cermet with fragments of straight and closing parts from cermet in FIG. 7.
FIG. 9—Section B-B of the mold assembly in FIG. 6 to produce a ball plug from cermet with fragments of straight and closing parts.
   15—preliminarily sintered insert from TiC;
   16—cap (electrocorundum).
FIG. 10—Framework structure of the straight part of a ball plug from cermet (×1000).

EXAMPLE 1

A ball gate seat semi-product (FIG. 1) was produced entirely from TiC-based cermet with the matrix from Ni alloy ZhS6U with a fragment of spherical working part 1 and seat base 2 with the metal matrix content of 40 . . . 45% in the cermet volume. The working part had a matrix-framework structure, the main part had a matrix structure with isolated TiC carbides.

An expendable mold 3 was produced by lining an investment mold with electrocorundum (FIG. 2).

Ring-shaped insert semi-products were produced from TiC powder with a fraction of 14 . . . 20 µm with 15% of cold binder in the volume (4% solution of benzene-based synthetic rubber) using the known pressing technology. "Raw" insert semi-products were sintered in vacuum at 1600° C. for 1 h after the cold binder removal at 250° C. The pressing and sintering regimes were chosen so that the porosity of sintered carbide inserts was 40 . . . 45%.

The sintered carbide insert 4 was assembled in the mold 3 and fixed with the ceramic plug 5. After that the set portion of TiC powder was placed and vibratingly compacted in the mold to produce a carbide compact with a porosity of 40 . . . 45%. Then the mold was placed in the chamber of the melting complex comprising a resistance heating furnace and a vacuum-induction melting furnace. The chamber was pressurized, the residual pressure was reduced to the level not higher than 0.1 Pa, which was maintained through the process. The mold with the carbide compact was heated to 1600° C., held for 1 h to produce a sintered carbide semi-product with a porosity of 40 . . . 45% and cooled to 1500° C. The Ni-based alloy ZhS6U was melted in the induction furnace crucible and cast in the mold at 1550° C. After casting the mold was held at 1500° C. for 25 min and removed downwards from the high-temperature zone with a rate of 7 . . . 8 mm/min.

The mold was removed at 600° C. from the chamber, then cooled in air and the produced cermet semi-product was removed from the mold through breaking the latter.

The temperature was controlled with an infrared thermometer and a tungsten-rhenium thermocouple.

The result: a pore-free seat semi-product was produced entirely from the TiC cermet with the matrix from ZhS6U alloy with the same chemical composition. The fragment of the working part 4 had a matrix-framework structure with partially isolated TiC grains with the metal content of 40 . . . 45%. The seat base had a matrix structure with isolated TiC grains with the metal content of 40 . . . 45%.

FIG. 3 displays the structure of the working part of the seat semi-product with the matrix-framework structure. FIG. 4 demonstrates the structure of the seat base made from TiC-ZhS6U cermet with the matrix structure.

EXAMPLE 2

A ball plug semi-product was produced from TiC cermet with the matrix from Ni alloy ZhS6U (FIG. 5) having a matrix-framework structure in the whole volume. The fragment of the straight part was produced from cermet 8 with the metal matrix content 29 . . . 32%, the main part 9—40 . . . 45%.

The mold was assembled in accordance with FIG. 6.

The insert 10 with a porosity 29 . . . 32% was produced in a metal press mold by vibrating compaction and vacuum sintering of TiC powder according to the known technology.

Producing an expendable mold 12 and caps 13 was performed as in Example 1. After assembling a carbide insert was covered with caps 13 on both sides and fixed with ceramic glue on the ethylsilicate bond.

After casting the mold was held at 1500° C. for 10 min.

Further process was implemented as in Example 1.

The result: a pore-free seat semi-product from cermet with the matrix from ZhS6U was produced. A fragment of the working part had a volume content of metal 29 . . . 32%, the rest part had 40 . . . 45%. The cermet had a matrix-framework structure through the whole volume.

EXAMPLE 3

A ball plug semi-product was produced from TiC cermet with the matrix from Ni alloy ZhS6U (FIG. 7 and FIG. 8) having a framework structure in the whole volume. The fragments of the ball plug closing part 14 were produced from cermet with the metal content of 40 . . . 45%, the fragments of the ball plug straight part 8—29 . . . 32%, those of the main part 9-59 . . . 63%.

The mold was assembled in accordance with FIGS. 6 and 9.

The sintered insert semi-products of the closing part 15 with a porosity of 40 . . . 45% and the straight part 10 with porosity 29 . . . 32% were produced according to the known technology. The porosity and thickness of walls between the pores were adjusted via introducing easily removable porogene agents and using mixtures of TiC powders of fine and coarse fractions.

The insert of the straight part 10 was covered with caps 13, the insert of the closing part 15 was covered with caps 16 and fixed with ceramic glue (FIG. 9). An expendable mold 12, caps 13 and 16 were produced as in Example 1. After the TiC powder was placed in the mold, the mold was held at 1600° C. for 2 hours.

Further process was implemented as in Example 1.

The result: a pore-free ball plug semi-product was produced from TiC cermet with the matrix from ZhS6U alloy. The volume content of the matrix in fragments of the straight part was 29 . . . 32%, that of the closing part was 40 . . . 45%, that of the main part was 59 . . . 63%. The cermet had a framework structure through the volume.

FIG. 10 displays a typical framework structure of the straight part of the ball plug.

EXAMPLE 4

A ball plug semi-product was produced according to the prototype-method.

A TiC semi-product with a porosity 40 . . . 45% was preliminarily produced via pressing and vacuum sintering.

The porous semi-product was placed in an electrocorundum mold and fixed. A portion of infiltrate was placed on the porous semi-product and the assembly was placed in the graphite crucible of the vacuum-induction furnace.

After vacuum buildup (the residual pressure not higher than 0.1 Pa) the inductor was switched on. The graphite crucible and the mold were heated to 1500±15° C., a portion of metal was melted and held for 10 min.

The result: a seat semi-product was produced entirely from TiC cermet with the matrix from ZhS6U in the volume 40 . . . 45%. The cermet structure is inhomogeneous. The top zone is damaged due to separation and surfacing of some fragments of the carbide semi-product. The bottom zone has mainly a framework structure; the top zone has mainly a matrix structure.

Thus, the claimed invention comprising manufacturing of the ball gate semi-product from cermet through one-stage infiltration of the sintered porous TiC semi-product with molten metal after sintering allows producing high quality due to ensuring the set structure and characteristics of hardness and bending (structural) strength in different parts of an item.

The Table lists the averaged mechanical properties of cermets with different content of the metal matrix.

Mechanical properties of cermet in accordance with the invention *

| Testing temperature, °C. | Cermet TiC-ZhS6U Metal content, % in the volume | | |
|---|---|---|---|
| | 29-32% (TiC grains form a framework) | 40-45% (TiC grains forma a partial framework) | 59-63% (TiC grains are entirely isolated) |
| Compression strength, MPa | | | |
| 20 | 2900 | 2440 | 2180 |
| 300 | 2710 | 2290 | 1990 |
| 600 | 2420 | 2110 | 1780 |
| 900 | 1370 | 1240 | 960 |
| Bending strength, MPa | | | |
| 20 | 1010 | 1145 | 1260 |
| 300 | 950 | 1105 | 1205 |
| 600 | 870 | 1030 | 1120 |
| 900 | 730 | 880 | 940 |
| Hardness, HRC | | | |
| 20 | 64 . . . 67 | 59 . . . 61 | 54 . . . 57 |

* Samples for compression tests (5 * 5 * 7.5 mm) and bending (5 * 5 * 25 mm) are cut by electroerosion method from ball gate semi-products, the results have been obtained through averaging of values via 3-5 measurements.

The invention claimed is:

1. A method of producing a cermet ball gate having a homogeneous structure, comprising the steps of:
    preparing a mold with a vent from refractory material;
    vibrating, and compacting a TiC powder;
    sintering of the TiC powder in a furnace of a heating chamber under nonoxidizing conditions to produce a porous carbide intermediate product;
    placing an infiltrate on the carbide intermediate product and heating the carbide intermediate product and infiltrate to a temperature exceeding a liquidus point of the infiltrate;
    infiltrating the carbide intermediate product with a molten metal to produce directed solidification of metal in a pore volume of the carbide intermediate product, wherein the infiltration is performed in the mold in a single stage immediately after the sintering step and is completed within 10 minutes; and
    cooling the infiltrated carbide intermediate product by shifting the mold downwards against a heating front to produce a cermet ball gate material that has a homogenous structure;
    wherein:
    the infiltrate is melted in a separate crucible located inside the heating chamber;
    the molten metal is cast in the mold through the vent until contacting the carbide intermediate product; and
    the mold temperature is maintained throughout the infiltration step.

2. The method of producing a cermet ball gate having a homogeneous structure of claim 1, further comprising:
    preparing one or more sintered carbide inserts;
    placing and fixing the sintered carbide inserts in one or more separate parts of the mold;
    filling a free volume of the mold with the TiC powder;
    compacting and sintering the carbide powder and the one or more sintered carbide inserts to produce the carbide intermediate product;
    wherein the cermet ball gate material contains fragments of the sintered carbide inserts and the infiltrate metal.

3. The method of producing a cermet ball gate having a homogeneous structure of claim 1, wherein the cermet ball gate material has a matrix structure and the carbide intermediate product has a porosity of 55 to 70%.

4. The method of producing a cermet ball gate having a homogeneous structure of claim 1, wherein the cermet ball gate material has a framework structure and the carbide intermediate product has a porosity of 25 to 35%.

5. The method of producing a cermet ball gate having a homogeneous structure of claim 1, wherein the cermet ball gate material has a matrix-framework structure and the carbide intermediate product has a porosity of 35 to 55%.

6. The method of producing a cermet ball gate having a homogeneous structure of claim 1, wherein the metal comprises a nickel-based alloy.

7. The method of producing a cermet ball gate having a homogeneous structure of claim 1, wherein the carbide intermediate product is pore-free and has a matrix-framework structure throughout the whole volume.

8. The method of producing a cermet ball gate having a homogeneous structure of claim 1, wherein the carbide intermediate product has a porosity of 40-45%.

9. The method of producing a cermet ball gate having a homogeneous structure of claim 1, wherein the infiltrating step is performed at a pressure not higher than 0.1 Pa.

10. The method of producing a cermet ball gate having a homogeneous structure of claim 1, wherein the carbide intermediate product has a matrix-framework structure with partially isolated TiC grains and a metal content of 40-45%.

11. The method of producing a cermet ball gate having a homogeneous structure of claim 1, wherein the sintering step is performed under vacuum conditions.

12. The method of producing a cermet ball gate having a homogeneous structure of claim 1, wherein the cermet ball gate material has a hardness of 54-57, 59-61 or 64-67 HRC measured at 20° C.

13. The method of producing a cermet ball gate having a homogeneous structure of claim 1, wherein the cermet ball gate material has a compression strength of at least 2,440 MPa measured at 20° C.

14. The method of producing a cermet ball gate having a homogeneous structure of claim 1, wherein the cermet ball gate material has a bending strength of at least 1,145 MPa measured at 20° C.

15. The method of producing a cermet ball gate having a homogeneous structure of claim 1, wherein the cermet ball gate material has a compression strength of at least 2,900 MPa measured at 20° C.

16. The method of producing a cermet ball gate having a homogeneous structure of claim 1, wherein the cermet ball gate material has a bending strength of at least 1,260 MPa measured at 20° C.

* * * * *

UNITED STATES PATENT AND TRADEMARK OFFICE
CERTIFICATE OF CORRECTION

| | | |
|---|---|---|
| PATENT NO. | : 10,132,416 B2 | Page 1 of 1 |
| APPLICATION NO. | : 14/425021 | |
| DATED | : November 20, 2018 | |
| INVENTOR(S) | : Rustam Faritovich Mamleev | |

It is certified that error appears in the above-identified patent and that said Letters Patent is hereby corrected as shown below:

On the Title Page

- Assignee reads:
MAROMA TECHHNOLOGIES

- Assignee should read:
MAROMA TECHNOLOGIES

Signed and Sealed this
Twenty-second Day of January, 2019

Andrei Iancu
*Director of the United States Patent and Trademark Office*